US010006128B2

(12) United States Patent
Webber et al.

(10) Patent No.: US 10,006,128 B2
(45) Date of Patent: *Jun. 26, 2018

(54) QUATERNARY AND CATIONIC AMMONIUM SURFACTANTS AS CORROSION INHIBITORS

(71) Applicant: Ecolab USA Inc., Naperville, IL (US)

(72) Inventors: Peter A. Webber, Sugar Land, TX (US); Peter G. Conrad, Sugar Land, TX (US); Austen K. Flatt, Sugar Land, TX (US); Victor V. Keasler, Richmond, TX (US)

(73) Assignee: Ecolab USA Inc., St. Paul, MN (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/630,926

(22) Filed: Sep. 28, 2012

(65) Prior Publication Data

US 2014/0091262 A1    Apr. 3, 2014

(51) Int. Cl.
| | |
|---|---|
| C09K 5/00 | (2006.01) |
| C23F 11/14 | (2006.01) |
| C09K 8/54 | (2006.01) |
| C23F 11/10 | (2006.01) |

(52) U.S. Cl.
CPC .............. *C23F 11/145* (2013.01); *C09K 8/54* (2013.01); *C23F 11/10* (2013.01)

(58) Field of Classification Search
CPC ...... C02F 1/00; C02F 5/12; C02F 5/14; C23F 11/00; C23F 11/10; C23F 11/14; C23F 11/141; C23F 11/145; C23F 11/167; C09K 5/00; C09K 5/08; C09K 5/10; C09K 8/54; C09K 2208/22; C09K 2208/32

USPC .............. 252/70, 71, 73, 77, 78.5, 175
See application file for complete search history.

(56) References Cited

U.S. PATENT DOCUMENTS

| | | | | |
|---|---|---|---|---|
| 2,295,655 | A | * | 9/1942 | Hentrich .............. C07C 237/00 510/131 |
| 2,888,383 | A | * | 5/1959 | Byrne ..................... A61K 8/44 424/54 |
| 3,239,470 | A | * | 3/1966 | Michal ......................... 252/391 |
| 3,384,590 | A | * | 5/1968 | Eversole et al. ................ 252/70 |
| 4,053,329 | A | * | 10/1977 | Castellucci et al. ....... 428/472.2 |
| 4,339,349 | A | * | 7/1982 | Martin et al. ................. 507/238 |
| 4,426,362 | A | | 1/1984 | Copeland et al. |
| 4,530,802 | A | * | 7/1985 | Sung et al. ................... 558/208 |
| 4,552,672 | A | | 11/1985 | Walker |
| 4,687,121 | A | | 8/1987 | Copeland |
| 4,690,305 | A | | 9/1987 | Copeland |
| RE32,763 | E | | 10/1988 | Fernholtz et al. |
| RE32,818 | E | | 1/1989 | Fernholtz et al. |
| 4,826,661 | A | | 5/1989 | Copeland et al. |

(Continued)

FOREIGN PATENT DOCUMENTS

| | | |
|---|---|---|
| JP | 2004-107521 A | 4/2004 |
| WO | 2013/048365 A1 | 4/2013 |

*Primary Examiner* — Jane L Stanley
(74) *Attorney, Agent, or Firm* — Senniger Powers LLP

(57) ABSTRACT

Disclosed herein are corrosion inhibiting compounds and compositions useful in applications relating to the production, transportation, storage, and separation of crude oil and natural gas. Also disclosed herein are methods of using the compounds and compositions as corrosion inhibitors, particularly in applications relating to the production, transportation, storage, and separation of crude oil and natural gas.

24 Claims, 2 Drawing Sheets

(56) References Cited

U.S. PATENT DOCUMENTS

| | | | |
|---|---|---|---|
| 5,336,441 A | | 8/1994 | Shah et al. |
| 5,565,416 A | * | 10/1996 | Wu ............................ 507/103 |
| 5,853,619 A | * | 12/1998 | Watson et al. ............... 252/391 |
| 6,596,911 B2 | | 7/2003 | Przybylinski et al. |
| 6,727,387 B2 | | 4/2004 | Mukkamala et al. |
| 7,264,653 B2 | | 9/2007 | Panchalingam et al. |
| 7,381,689 B2 | | 6/2008 | Panchalingam et al. |
| 7,989,403 B2 | * | 8/2011 | Acosta et al. ............... 507/240 |
| 8,177,962 B2 | | 5/2012 | Koizumi et al. |
| 8,288,323 B2 | * | 10/2012 | Acosta et al. ............... 507/90 |
| 8,329,620 B2 | | 12/2012 | Acosta |
| 8,334,240 B2 | | 12/2012 | Acosta |
| 8,618,025 B2 | * | 12/2013 | Webber ........................ 507/240 |
| 2003/0013769 A1 | | 1/2003 | Mukkamala et al. |
| 2006/0043340 A1 | | 3/2006 | Koizumi et al. |
| 2012/0157351 A1 | | 6/2012 | Webber |
| 2012/0161070 A1 | * | 6/2012 | Webber et al. .......... 252/182.29 |
| 2013/0228095 A1 | * | 9/2013 | Miles et al. ............... 106/14.42 |

* cited by examiner

QUATERNARY AND CATIONIC AMMONIUM SURFACTANTS AS CORROSION INHIBITORS

TECHNICAL FIELD

The present disclosure relates generally to corrosion inhibitors, and more particularly to quaternary and cationic ammonium surfactants as corrosion inhibitors.

BACKGROUND

Corrosion of metal surfaces in aqueous media has long been a problem for industries such as the oil and gas industry, food/beverage industry, and wash/sanitizing industry. For example, it is well known that during the production of oil and gas several other corrosive components are present such as brines, organic acids, carbon dioxide, hydrogen sulfide, and microorganisms. These aggressive constituents can cause severe corrosion to metal pipes, which are often made of low-alloy steels. This problem is even more troublesome in deep-sea operations where replacement of corroded equipment is difficult and costly.

It is common practice to employ corrosion inhibitors during the production, transportation, storage, and separation of crude oil and natural gas. Corrosion inhibitors are usually surface-active compounds that form protective coatings on the surfaces of metal components, which come in contact with corrosive environments. Among the most frequently used corrosion inhibitors in crude oil and natural gas extraction are imidazoline derivatives.

In the food/beverage and wash/sanitizing industry, solutions such as sodium hypochlorite solutions are commonly used and are highly effective as bleaches and sanitizers for cleaning a variety of surfaces. However, sodium hypochlorite solutions are corrosive to many treated surfaces, in particular, metal surfaces become highly corroded.

Despite the availability of corrosion inhibitors for use in the oil and gas industry, food/beverage, and wash/sanitizing industry, there still exists a need for improved compounds, compositions and methods for providing corrosion inhibition.

SUMMARY

In one aspect, disclosed are methods for inhibiting corrosion using a compound of formula (I), or a composition comprising a compound of formula (I),

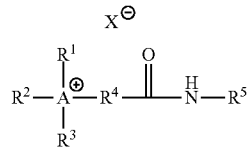

(I)

wherein,
$R^1$ is $C_1$-$C_6$ alkyl, $C_1$-$C_6$ alkenyl, $C_1$-$C_6$ alkynyl, $C_3$-$C_8$ cycloalkyl, or benzyl;
$R^2$ is H, $C_1$-$C_6$ alkyl, $C_1$-$C_6$ alkenyl, $C_1$-$C_6$ alkynyl, $C_3$-$C_8$ cycloalkyl, or benzyl;
$R^3$ is H, $C_1$-$C_6$ alkyl, $C_1$-$C_6$ alkenyl, $C_1$-$C_6$ alkynyl, $C_3$-$C_8$ cycloalkyl, or benzyl;
$R^4$ is —$(CH_2)_t$—, —[$CH_2$—$(CHR^6)_t$]—, or —[($CH_2$—$CHR^6O)_u$—$(CH_2)_t$]—;
$R^5$ is $C_4$-$C_{20}$ alkyl or $C_4$-$C_{20}$ alkenyl;
$R^6$ is H, $C_1$-$C_6$ alkyl, $C_1$-$C_6$ alkenyl, $C_1$-$C_6$ alkynyl, or $C_3$-$C_8$ cycloalkyl;
A is N or P;
X is a counterion;
t is an integer independently selected from 1, 2, 3, 4, 5, and 6; and
u is an integer independently selected from 1, 2, 3, 4, 5, and 6.

A method may include inhibiting corrosion on a surface by contacting the surface with an effective amount of a compound of formula (I), or a composition comprising a compound of formula (I).

A method may include inhibiting corrosion on a surface of a solid at least partially submerged in a fluid, the method including adding to the fluid an effective amount of a compound of formula (I), or a composition comprising a compound of formula (I).

In certain embodiments, $R^5$ in formula (I) may be $C_4$-$C_{20}$ alkyl or $C_4$-$C_{20}$ alkenyl. $R^5$ may be a saturated or unsaturated $C_8$, $C_{10}$, $C_{12}$, $C_{14}$, $C_{16}$, or $C_{18}$. $R^5$ may be derived from cocoamine.

In certain embodiments, $R^1$ may be n-butyl; $R^2$ may be n-butyl; $R^3$ may be H; $R^4$ may be —$CH_2CH_2$—; and X may be acetate anion. $R^5$ may be —$C_{12}H_{25}$ or —$C_{14}H_{29}$.

A method may include use of a composition comprising a mixture of compounds of formula (I). The mixture may include compounds of formula (I) wherein each $R^5$ group is independently selected from the group consisting of $C_4$-$C_{20}$ alkyl and $C_4$-$C_{20}$ alkenyl. The mixture may include compounds of formula (I) wherein each $R^5$ group is independently a saturated or unsaturated $C_8$, $C_{10}$, $C_{12}$, $C_{14}$, $C_{16}$, or $C_{18}$. The mixture may include a distribution of compounds of formula (I) wherein $R^5$ is about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$).

A method may include use of a composition comprising a mixture of compounds of formula (I), wherein the mixture is represented by formula (I-i). Coco may be derived from cocoamine. Coco may be about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$).

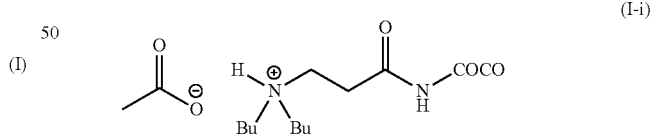

(I-i)

A method may include co-administering with a compound of formula (I), or a composition comprising a compound of formula (I), an effective amount of a corrosion inhibitor synergist. The corrosion inhibitor synergist may be 2-mercaptoethanol.

A method may include use of a corrosion inhibiting compound of formula (I), or composition comprising a compound of formula (I), that provides at least about 90% corrosion protection for a carbon steel coupon (e.g., a 1018 carbon steel coupon) in a wheel box test, wherein the wheel box test is characterized by a testing temperature of about 176° F.; a $CO_2$ saturated liquid medium of 10% LVT-200 oil and 90% ASTM Seawater brine; a test duration of 24 hours; and an inhibitor dosage of 100 ppm, 500 ppm, 1,000 ppm, 5,000 ppm, 7,500 ppm, or 15,000 ppm based on total fluids. The compound or composition may provide about 88-98% corrosion protection. The compound or composition may provide 88% corrosion protection, 89% corrosion protection, 90% corrosion protection, 94% corrosion protection, 96% corrosion protection, or 98% corrosion protection.

A method may include use of a corrosion inhibiting compound of formula (I), or composition comprising a compound of formula (I), that provides at least 80% protection after two hours, at least 85% protection after 8 hours, and about 100% protection after 21 hours for a carbon steel working electrode (e.g., a 1018 carbon steel working electrode) in a bubble test, wherein the bubble test is characterized by a testing temperature of about 60° C.; a $CO_2$ saturated liquid medium of 20% LVT-200 oil and 80% ASTM Seawater brine; and an inhibitor dosage of 7,500 ppm based on total fluids. The compound or composition may provide about 82.0% protection after two hours, about 87.3% protection after 8 hours, and about 100.0% protection after 21 hours.

A method may include use of a corrosion inhibiting composition including at least one compound of formula (I) and one or more additional components. An additional component may be, but is not limited to, a synergistic compound, an asphaltene inhibitor, a paraffin inhibitor, a corrosion inhibitor, a scale inhibitor, an emulsifier, a water clarifier, a dispersant, an emulsion breaker, a hydrogen sulfide scavenger, a gas hydrate inhibitor, a biocide, a pH modifier, a surfactant, or a solvent.

In certain embodiments, a surface to which a compound of formula (I), or composition comprising a compound of formula (I), may be applied may be part of an apparatus used in the production, transportation, storage, and/or separation of crude oil and natural gas.

The compounds, compositions, methods and processes are further described herein.

DETAILED DESCRIPTION

Figure 1:
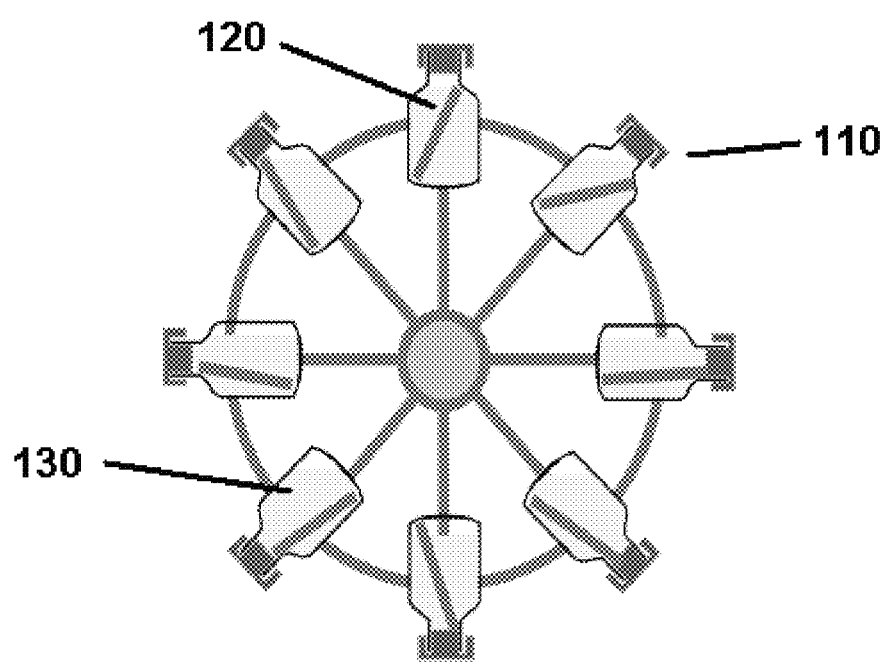
FIG. 1 depicts a wheel box apparatus used to test corrosion inhibiting ability of compounds and compositions.

Disclosed herein are corrosion inhibiting compounds and compositions, methods of using said compounds and compositions, and processes for their preparation. It has been surprisingly and unexpectedly found that compounds and compositions of the invention, as described below, possess corrosion inhibiting properties, in addition to anti-agglomerate properties. Use of the compounds and compositions of the invention as corrosion inhibitors and as anti-agglomerates eliminates the need for introducing a separate corrosion inhibitor in an oil and gas industrial process, thereby resulting in operational and economic efficiencies. As a further advantage, the compounds and compositions of the invention can be dosed at high concentrations while maintaining acceptable corrosion inhibition, in contrast to conventional corrosion inhibitors. Further, in contrast to conventional corrosion inhibitors, the compounds and compositions of the invention can be dosed at high concentrations without causing corrosive activity themselves.

Definition of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The term "alkenyl", as used herein, means a straight or branched hydrocarbon radical having one or more carbon-carbon double bonds. Alkenyl groups of the present invention include, but are not limited to, ethenyl, 1-propenyl, 2-propenyl (allyl), iso-propenyl, 2-methyl-1-propenyl, 1-butenyl, and 2-butenyl.

The term "alkyl", as used herein, means a linear or branched hydrocarbon radical, preferably having 1, 2, 3, 4, 5, 6, 7, 8, 9, 10, 11, 12, 13, 14, 15, 16, 17, 18, 19, or 20 carbons. Alkyl groups of the present invention include, but are not limited to, methyl, ethyl, n-propyl, isopropyl, n-butyl, iso-butyl, secondary-butyl, and tertiary-butyl.

The term "alkynyl", as used herein, means a straight or branched hydrocarbon radical having one or more carbon-carbon triple bonds. Alkynyl groups of the present invention include, but are not limited to, ethynyl, propynyl, and butynyl.

The term "cocoamine", as used herein, refers to a mixture of amines comprising about 95% primary amines, and about 5% combined secondary and tertiary amines. The primary amines are about 6% hexylamine ($C_6$), about 7% decylamine ($C_{10}$), about 51% dodecylamine ($C_{12}$), about 19% tetradecylamine ($C_{14}$), about 9% hexadecylamine ($C_{16}$), about 2% octadecylamine ($C_{18}$), and about 6% combined content of octadecenylamine ($C_{18}$) and octadecadienylamine ($C_{18}$). The major component of cocoamine is $C_{12}H_{25}NH_2$. Cocoamine is sold under the product name ARMEEN® C by Akzo Nobel Surface Chemistry, LLC, 15200 Almeda Road, Houston, Tex. 77053, United States of America.

The term "coco", as used herein, refers to a mixture of carbon chain radicals derived from cocoamine. The mixture of carbon chain radicals is about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$). The major component of coco is a —$C_{12}H_{25}$ carbon chain radical.

The term "counterion", as used herein, means a halide (e.g., fluoride, chloride, bromide, iodide) or a carboxylate anion, such as selected from deprotonation of mineral acid, acrylic acid, acetic acid, methacrylic acid, glycolic acid, thioglycolic acid, propionic acid, butyric acid, and the like.

The term "cycloalkyl", as used herein, means a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1] heptanyl, bicyclo[3.2.1]octanyl and bicyclo[5.2.0]nonanyl, etc.); optionally containing 1 or 2 double bonds.

The term "decyl", as used herein, means a —$C_{10}H_{21}$ alkyl radical, also referred to as "capryl".

The term "dodecyl", as used herein, means a —$C_{12}H_{25}$ alkyl radical, also referred to as "lauryl".

The term "hexadecyl", as used herein, means a —$C_{16}H_{33}$ alkyl radical, also referred to as "palmityl".

The term "hexyl", as used herein, means a —$C_6H_{13}$ alkyl radical, also referred to as "caproyl".

The term "octadecadienyl", as used herein, means a cis,cis-9,12-octadecadienyl radical, also referred to as "linoleyl".

The term "octadecenyl", as used herein, means a cis-9-octadecenyl radical, also referred to as "oleyl".

The term "octadecyl", as used herein, means a —$C_{18}H_{37}$ alkyl radical, also referred to as "stearyl".

The term "octyl", as used herein, means a —$C_8H_{17}$ alkyl radical, also referred to as "caprylyl."

The term "tetradecyl", as used herein, means a —$C_{14}H_{29}$ alkyl radical, also referred to as "myristyl".

The term "water cut", as used herein, means the percentage of water in a composition containing an oil and water mixture.

1. METHODS OF USE

Disclosed herein is a method for inhibiting corrosion of a solid by contacting the solid with an effective amount of a compound or composition of the invention, as described below. The method can be used to inhibit corrosion at a surface of the solid, by contacting the surface with a compound or composition of the invention. For example, where the solid is exposed to a corrosive fluid, the method can be used to inhibit corrosion at the surface by contacting the surface with an effective amount of a compound or composition of the invention.

A variety of suitable surfaces may be contacted with the compound or composition according to the invention. Particularly suitable surfaces for treatment with the corrosion inhibitor compositions according to the invention include metallic and metal-containing surfaces, including steel, rolled steel and stainless steel. The solid may further include a metal or an alloy comprising aluminum, steel, stainless steel, brass, bronze, carbon steel, copper, ferrous material, iron, magnesium, nickel, titanium, or zinc.

2. METHOD OF USE FOR THE OIL/GAS INDUSTRY

The method can use the compounds and compositions of the invention as both corrosion inhibitors and as gaseous hydrate anti-agglomerates in the oil/gas industry. Use of the compounds and compositions of the invention as corrosion inhibitors and anti-agglomerates eliminates the need for introducing a separate corrosion inhibitor in an oil and gas industrial process, thereby resulting in operational and economic efficiencies. For example, in deepwater operations there are a limited number of umbilical lines available to add separate chemical compositions, such as separate corrosion inhibitors. Use of the compounds and compositions of the invention for multiple functions, such as corrosion inhibition and anti-agglomeration, simplifies industrial oil and gas operations and provides an economic advantage over conventional processes by reducing the number of required umbilical lines to an oil and/or gas pipeline.

As a further advantage, the compounds and compositions of the invention can be dosed at high concentrations while maintaining acceptable corrosion inhibition, in contrast to many conventional corrosion inhibitors. Further, in contrast to conventional corrosion inhibitors, the compounds and compositions of the invention can be dosed at high concentrations without causing corrosive activity themselves.

As stated above, solid treated with a compound or composition of the invention for the oil/gas industry may include at least one metal. For example, the solid may include a metal or an alloy comprising aluminum, steel, stainless steel, brass, bronze, carbon steel, copper, ferrous material, iron, magnesium, nickel, titanium, or zinc. In one embodiment, the solid may include carbon steel, such as 1018 carbon steel. Accordingly, a compound or composition of the invention may be particularly useful for oil and gas industrial applications and processes, including the production, transportation, storage, and separation of crude oil and natural gas.

The method may provide at least 80, 81, 82, 83, 84, 85, 86, 87, 88, 89, 90, 91, 92, 93, 94, 95, 96, 97, 98, or 99% corrosion protection for a solid, optionally as defined by a 1018 carbon steel coupon in a wheel box test. A wheel box test may be performed according to NACE publication ID182 (December 1982). The wheel box is a test that is often used to compare the performance of one corrosion inhibitor to another. In certain embodiments, the method provides at least 88% corrosion protection for a 1018 carbon steel coupon in a wheel box test, wherein the wheel box test is characterized by a testing temperature of about 176° F.; a $CO_2$ saturated liquid medium of 10% LVT-200 oil and 90% ASTM Seawater brine; a test duration of 24 hours; and an inhibitor dosage of 100 ppm, 500 ppm, 1,000 ppm, 5,000, 7,500 ppm, or 15,000 ppm based on total fluids. The compound or composition may provide about 88-98% corrosion protection. The compound or composition may provide 88% corrosion protection, 89% corrosion protection, 90% corrosion protection, 94% corrosion protection, 96% corrosion protection, or 98% corrosion protection.

The method may provide at least 90, 91, 92, 93, 94, 95, 96, 97, 98, 99, or 100% corrosion protection for a solid, optionally as defined by a 1018 carbon steel coupon in a bubble test. A bubble test simulates low flow areas where little or no mixing of water and oil occurs. In certain embodiments, the method provides at least 80% protection after two hours, at least 85% protection after 8 hours, and about 100% protection after 21 hours for a 1018 carbon steel working electrode in a bubble test, wherein the bubble test is characterized by a testing temperature of about 60° C.; a $CO_2$ saturated liquid medium of 20% LVT-200 oil and 80% ASTM Seawater brine; and an inhibitor dosage of 7,500 ppm based on total fluids. The method may provide about 82.0% protection after two hours, about 87.3% protection after 8 hours, and about 100.0% protection after 21 hours.

The method may include adding a compound or composition of the invention to a fluid. The method may be directed to inhibiting corrosion of a surface of a solid at least partially submerged in the fluid by adding to the fluid an effective amount of a compound or composition of the invention. The fluid to which the compounds and compositions may be introduced may be an aqueous medium, comprising water, gas, and optionally liquid hydrocarbon. The fluid can contain various levels of water cut. For example, the water cut may be from 0% to 100% volume/volume (v/v), from 1% to 80% v/v, or from 1% to 60% v/v. The fluid can be an aqueous medium that contains various levels of salinity. In one embodiment, the fluid has a salinity of 0% to 25%, about 1% to 24%, or about 10% to 25% weight/weight (w/w) total dissolved solids (TDS).

The fluid in which the compounds and compositions of the invention may be introduced may be contained in many different types of apparatuses. For example, the fluid may be contained in an apparatus that transports fluid from one point to another, such as an oil and/or gas pipeline. The fluid in which the compounds and compositions may be applied can be in contact with many different types of surfaces that are capable of corrosion. For example, in certain embodiments the surface may be a surface in an oil and/or gas refinery, such as a surface in a pipeline, a separation vessel, a dehydration unit, or a gas line. The surface may be a surface in a cooling water system. The surface may be a surface of a wellhead.

The method may include a step of introducing a compound or composition of the invention into a fluid by any appropriate method for ensuring dispersal of the inhibitor through the fluid. The inhibitor may be injected using mechanical equipment such as chemical injection pumps, piping tees, injection fittings, and the like. The method may include injecting the compound or composition of the invention with or without one or more additional polar or nonpolar solvents depending upon the application and requirements. In certain embodiments, the compounds and compositions of the invention may be pumped into an oil and/or gas pipeline using an umbilical line. In certain embodiments, capillary injection systems can be used to deliver the compounds and compositions to a selected fluid.

In general, the method can apply the compounds and compositions of the invention to a fluid (e.g., a fluid contained in an oil and/or gas pipeline) in a dose of about 0.1% volume to about 3% volume based on water cut, about 0.1% volume to about 2% volume based on water cut, or about 0.25% volume to about 1.5% volume based on water cut. The method can apply the compounds and compositions of the invention to a fluid at a concentration of about 10 parts per million (ppm) to about 50,000 ppm, about 100 ppm to about 45,000 ppm, about 500 ppm to about 40,000 ppm, about 1,000 ppm to about 35,000 ppm, about 3,000 ppm to about 30,000 ppm, about 4,000 ppm to about 25,000 ppm, about 5,000 ppm to about 20,000 ppm, about 6,000 ppm to about 15,000 ppm, or about 7,000 ppm to about 10,000 ppm. The method can apply the compounds and compositions of the invention to a fluid at a concentration of about 4,000 ppm to about 8,000 ppm, or about 5,000 ppm to about 7,500 ppm.

The method may include co-administration of a compound or composition of the invention with a corrosion inhibitor synergist. The corrosion inhibitor synergist may be thioglycolic acid, 3,3'-dithiodipropionic acid, thiosulfate, thiourea, 2-mercaptoethanol, L-cysteine, or tert-butyl mercaptan. In certain embodiments, the corrosion inhibitor synergist is 2-mercaptoethanol.

3. OTHER METHODS OF USE

The method for inhibiting corrosion of a solid by contacting the solid with an effective amount of the compound or composition of the invention, as described below may be applied in a number of other uses.

The compounds and compositions of the present invention are useful for corrosion inhibition of containers, processing facilities, or equipment in the food service or food processing industries. The compounds and compositions have particular value for use on food packaging materials and equipment, and especially for cold or hot aseptic packaging. Examples of process facilities in which the compound of the invention can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The compounds and compositions of the invention can be used to inhibit corrosion in tanks, lines, pumps, and other equipment used for the manufacture and storage of soft drink materials, and also used in the bottling or containers for the beverages.

The compounds and compositions can also be used on or in other industrial equipment and in other industrial process streams such as heaters, cooling towers, boilers, retort waters, rinse waters, aseptic packaging wash waters, and the like. The compounds can be used to treat surfaces in recreational waters such as in pools, spas, recreational flumes and water slides, fountains, and the like.

According to an embodiment of the invention, it is desirable to use the corrosion inhibitor compositions and the claimed methods of use to inhibit the corrosion of metal surfaces contacted with cleaners in surfaces found in janitorial and/or housekeeping applications, food processing equipment and/or plant applications, and in laundry applications. For example, the corrosion of washers, such as tunnel washers for washing textiles, may be inhibited according to methods of the claimed invention.

In addition, surfaces may be contacted according to the methods of the present invention for use in low temperature dish and/or warewash sanitizing final rinse, toilet bowl cleaners, and laundry bleaches. According to further embodiments of the invention, the methods are used to treat metal surfaces, such as ware, cleaned and/or sanitized with corrosive sources.

a. Hypochlorite Solutions

The methods for corrosion inhibition according to the invention protect surfaces from corrosion caused by hypochlorite bleach. The method may include providing the corrosion inhibitor composition to a surface treated with a hypochlorite solution in order to inhibit corrosion caused by the hypochlorite solution. The method may include preparing an aqueous use composition of the present corrosion inhibitor composition. The method may further include contacting a surface, such as a hard metal surface, in need of corrosion inhibition due to contact with a hypochlorite solution.

b. Dispensing the Corrosion Inhibitor Compounds and Compositions

The corrosion inhibitor compounds and compositions according to the present invention may be dispensed in any suitable method generally known by one skilled in the art. For example, a spray-type dispenser may be used, such as that disclosed in U.S. Pat. Nos. 4,826,661, 4,690,305, 4,687,121, 4,426,362 and in U.S. Pat. Nos. Re 32,763 and 32,818, the disclosures of which are incorporated by reference herein. A spray-type dispenser functions by impinging a water spray upon an exposed surface of a composition to dissolve a portion of the composition, and then immediately directing the concentrate solution including the composition out of the dispenser to a storage reservoir or directly to a point of use.

The present corrosion inhibitor composition may be dispensed by immersing either intermittently or continuously in water. The composition can then dissolve, for example, at a controlled or predetermined rate. The rate can be effective to maintain a concentration of dissolved agent that is effective for use according to the methods of the claimed invention.

The present corrosion inhibitor composition may be dispensed by scraping from the composition and contacting the scrapings with water. The scrapings can be added to water to provide a concentration of dissolved corrosion inhibitor that is effective for use according to the methods of the claimed invention.

4. CORROSION INHIBITING COMPOUNDS/COMPOSITIONS a. Corrosion Inhibiting Compounds The methods described above use an effective amount of a compound of the invention, or a composition comprising a compound of the invention. The compounds of the invention include quaternary and cationic ammonium corrosion inhibitors of formula (I),

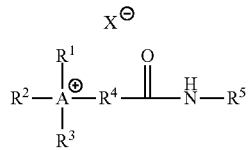

(I)

wherein,
$R^1$ is $C_1$-$C_6$ alkyl, $C_1$-$C_6$ alkenyl, $C_1$-$C_6$ alkynyl, $C_3$-$C_8$ cycloalkyl, or benzyl;
$R^2$ is H, $C_1$-$C_6$ alkyl, $C_1$-$C_6$ alkenyl, $C_1$-$C_6$ alkynyl, $C_3$-$C_8$ cycloalkyl, or benzyl;
$R^3$ is H, $C_1$-$C_6$ alkyl, $C_1$-$C_6$ alkenyl, $C_1$-$C_6$ alkynyl, $C_3$-$C_8$ cycloalkyl, or benzyl;
$R^4$ is $-(CH_2)_t-$, $-[CH_2-(CHR^6)_t]-$, or $-[(CH_2-CHR^6O)_u-(CH_2)_t]-$;
$R^5$ is $C_4$-$C_{20}$ alkyl or $C_4$-$C_{20}$ alkenyl;
$R^6$ is H, $C_1$-$C_6$ alkyl, $C_1$-$C_6$ alkenyl, $C_1$-$C_6$ alkynyl, or $C_3$-$C_8$ cycloalkyl;
A is N or P;
X is a counterion;
t is an integer independently selected from 1, 2, 3, 4, 5, and 6; and
u is an integer independently selected from 1, 2, 3, 4, 5, and 6.

In certain embodiments, compounds of the invention include corrosion inhibitors of formula (I-a), wherein $R^5$ is $C_4$-$C_{20}$ alkyl or $C_4$-$C_{20}$ alkenyl, and X is a counterion. In one embodiment, $R^5$ is $-C_{12}H_{25}$. In another embodiment, $R^5$ is $-C_{14}H_{29}$. In another embodiment, $R^5$ is $-C_8H_{17}$. In another embodiment, $R^5$ is $-C_{10}H_{21}$. In another embodiment, $R^5$ is $-C_{16}H_{33}$. In another embodiment, $R^5$ is $-C_{18}H_{37}$. In another embodiment, $R^5$ is $-C_{18}H_{35}$. In another embodiment, $R^5$ is $-C_{18}H_{33}$. In another embodiment, $R^5$ is derived from cocoamine.

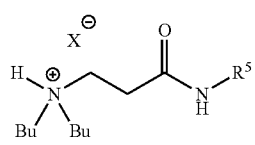

(I-a)

In certain embodiments, compounds of the invention include corrosion inhibitors of formula (I-b), wherein $R^5$ is $C_4$-$C_{20}$ alkyl or $C_4$-$C_{20}$ alkenyl. In one embodiment, $R^5$ is $-C_{12}H_{25}$. In another embodiment, $R^5$ is $-C_{14}H_{29}$. In another embodiment, $R^5$ is $-C_8H_{17}$. In another embodiment, $R^5$ is $-C_{10}H_{21}$. In another embodiment, $R^5$ is $-C_{16}H_{33}$. In another embodiment, $R^5$ is $-C_{18}H_{37}$. In another embodiment, $R^5$ is $-C_{18}H_{35}$. In another embodiment, $R^5$ is $-C_{18}H_{33}$. In another embodiment, $R^5$ is derived from cocoamine.

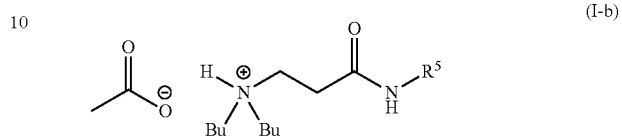

(I-b)

In certain embodiments, a corrosion inhibiting compound of the invention has formula (I-c).

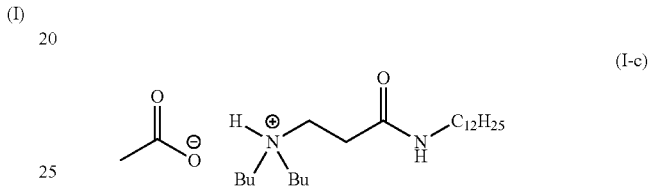

(I-c)

In certain embodiments, a corrosion inhibiting compound of the invention has formula (I-d).

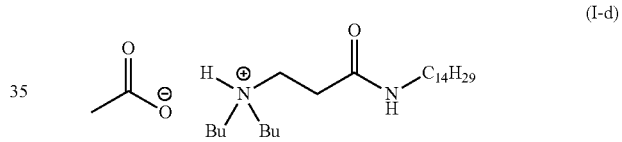

(I-d)

In certain embodiments, compounds of the invention include corrosion inhibitors of formula (I-e), wherein X is a counterion. In one embodiment, X is an acetate ($CH_3C(O)O^-$) counterion.

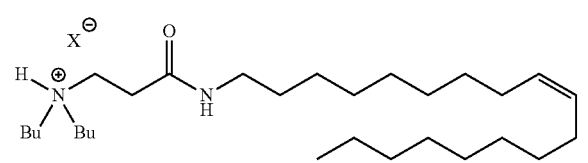

(I-e)

In certain embodiments, compounds of the invention include corrosion inhibitors of formula (I-f), wherein X is a counterion. In one embodiment, X is a bromide ($Br^-$) counterion.

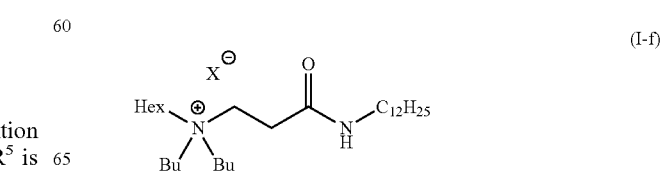

(I-f)

In certain embodiments, compounds of the invention include corrosion inhibitors of formula (I-g), wherein X is a counterion. In one embodiment, X is a bromide (Br⁻) counterion.

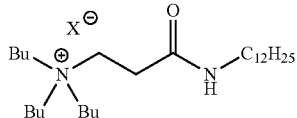

(I-g)

The compounds of the invention may contain asymmetric centers and can thus occur as racemates and racemic mixtures, single enantiomers, diastereomeric mixtures and individual diastereomers. Additional asymmetric centers may be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention. The present invention is meant to comprehend all such isomeric forms of these compounds.

b. Corrosion Inhibiting Compositions

The methods described above may use a corrosion inhibitor composition comprising at least one compound of formula (I). In certain embodiments, a corrosion inhibiting composition of the invention contains a pure composition of a compound of formula (I). In other embodiments, a corrosion inhibiting composition of the invention contains a mixture of two or more structurally distinct compounds of formula (I). For example, a corrosion inhibiting composition of the invention may comprise a mixture of compounds of formula (I) wherein $R^5$ is a saturated or unsaturated $C_8$, $C_{10}$, $C_{12}$, $C_{14}$, $C_{16}$, or $C_{18}$.

In certain embodiments, corrosion inhibitor compositions of the invention include a mixture of corrosion inhibitors represented by formula (I-h), wherein X is a counterion. The term "coco", as used herein, refers to a mixture of carbon chain radicals derived from cocoamine. The mixture of carbon chain radicals is about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$). The major component of coco is a —$C_{12}H_{25}$ carbon chain radical.

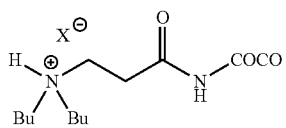

(I-h)

In certain embodiments, the corrosion inhibitor compositions of the invention include a mixture of corrosion inhibitors represented by formula (I-i), also referred to as N-butyl-N-(3-(cocoamino)-3-oxopropyl)butan-1-aminium acetate.

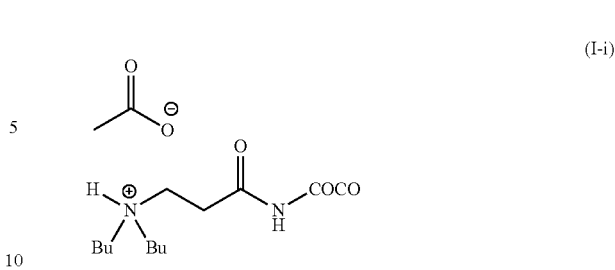

(I-i)

In certain embodiments, the corrosion inhibitor compositions of the invention include a mixture of corrosion inhibitors represented by formula (I-j), wherein X is a counterion.

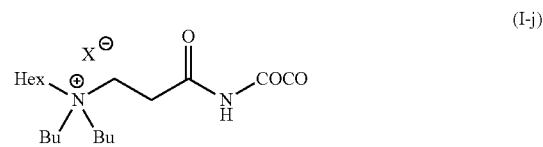

(I-j)

In certain embodiments, the corrosion inhibitor compositions of the invention include a mixture of corrosion inhibitors represented by formula (I-k), also referred to as N,N-dibutyl-N-(3-(cocoamino)-3-oxopropyl)hexan-1-aminium bromide.

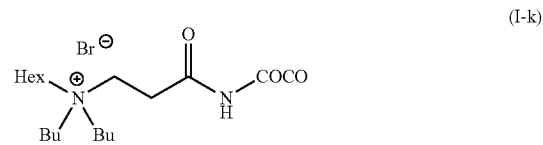

(I-k)

c. Additives

The corrosion inhibiting compositions of the invention can include one or more additives. Suitable additives include, but are not limited to, synergistic compounds, asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, and solvents.

1. Synergistic Compounds

Suitable synergistic compounds include compounds that enhance the corrosion performance of the composition. In certain embodiments, the synergistic compound may be a sulfur-containing synergist. Suitable synergist compounds include, but are not limited to, thioglycolic acid, 3,3'-dithiodipropionic acid, thiosulfate, thiourea, 2-mercaptoethanol, L-cysteine, and tert-butyl mercaptan. In one embodiment, the synergistic compound is 2-mercaptoethanol. In certain embodiments, the corrosion inhibiting compositions comprise 3.5% v/v of 2-mercaptoethanol and 20% actives of the corrosion inhibitors as described above. In certain embodiments, the synergistic compound comprises 0.5 wt % of the total formulation.

2. Asphaltene Inhibitors

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

3. Paraffin Inhibitors

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylpnenolic resins.

4. Corrosion Inhibitors

Suitable corrosion inhibitors include, but are not limited to, amidoamines, quaternary amines, amides, and phosphate esters.

5. Scale Inhibitors

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

6. Emulsifiers

Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

7. Water Clarifiers

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

8. Dispersants

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

9. Emulsion Breakers

Suitable emulsion breakers include, but are not limited to, dodecylbenzylsulfonic acid (DDBSA), the sodium salt of xylenesulfonic acid (NAXSA), expoxlated and propoxylated compounds, anionic cationic and nonionic surfactants, and resins, such as phenolic and epoxide resins.

10. Hydrogen Sulfide Scavengers

Suitable hydrogen sulfide scavengers include, but are not limited to, oxidants (e.g., inorganic peroxides such as sodium peroxide, or chlorine dioxide), and aldehydes (e.g., of 1-10 carbons such as formaldehyde or glutaraldehyde or (meth)acrolein).

11. Gas Hydrate Inhibitors

Suitable gas hydrate inhibitors include, but are not limited to, thermodynamic inhibitors (THI), kinetic inhibitors (KHI), and anti-agglomerates (AA). Suitable thermodynamic inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate). Suitable kinetic inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

12. Biocides

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilo-propionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

13. pH Modifiers

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, $Ca(OH)_2$, CaO, $Na_2CO_3$, $KHCO_3$, $K_2CO_3$, $NaHCO_3$, MgO, and $Mg(OH)_2$.

14. Surfactants

Suitable surfactants include, but are not limited to, anionic surfactants, cationic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialky sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropripionates and amphodipropionates, and alkyliminodiproprionate.

15. Solvents

Suitable solvents include, but are not limited to, isopropanol, methanol, ethanol, 2-ethylhexanol, heavy aromatic naphtha, toluene, ethylene glycol, ethylene glycol monobutyl ether (EGMBE), diethylene glycol monoethyl ether, and xylene. Representative polar solvents suitable for formulation with the inhibitor composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative of non-polar solvents suitable for formulation with the inhibitor composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

16. Additional Components

Corrosion inhibitor compositions made according to the invention may further include additional functional agents or additives that provide a beneficial property. For example, additional agents or additives may be selected from the group consisting of pH adjusters or other neutralizing agents, surfactants, emulsifiers, sequestrants, solubilizers, other lubricants, buffers, detergents, cleaning agent, rinse aid composition, secondary anti-corrosion agent, preservatives, binders, thickeners or other viscosity modifiers, processing aids, carriers, water-conditioning agents, foam inhibitors or foam generators, threshold agent or system, aesthetic enhancing agent (i.e., dye, odorant, perfume), other agents or additives suitable for formulation with a corrosion inhibitor composition and the like, and mixtures thereof. Additional agents or additives will vary according to the particular corrosion inhibitor composition being manufactured and its intend use as one skilled in the art will appreciate based on the enabling disclosure of the present invention. According to an additional embodiment of the invention, the corrosion inhibitor compositions do not contain any of the additional agents.

d. Synthetic Methods

The compounds and compositions of the invention can be better understood in connection with the following synthetic schemes and methods which illustrate a means by which the compounds can be prepared.

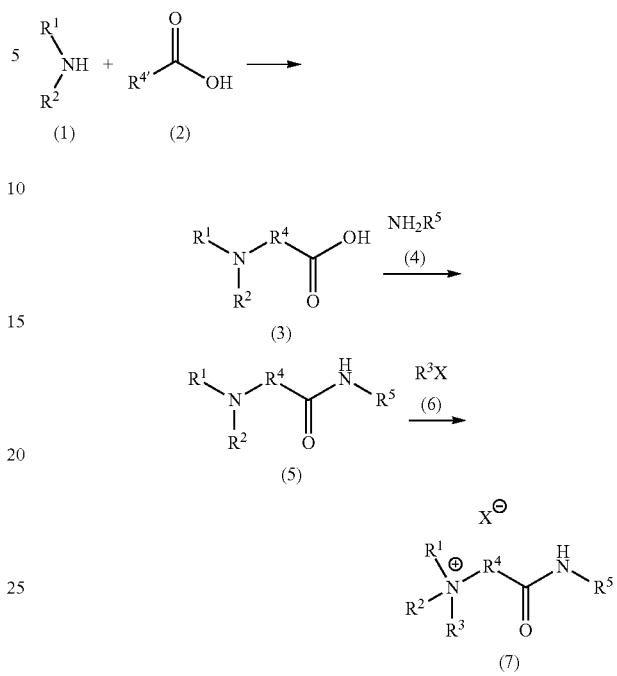

Compounds of formula (7) can be prepared as described in Scheme 1, wherein $R^1$, $R^2$, $R^3$, $R^4$, $R^5$, and X are as defined above. Treatment of an amine of formula (1) with a carboxylic acid of formula (2) will provide compounds of formula (3). $R^{4'}$ corresponds to $R^4$ as defined above, but masked as or having a functional group capable of undergoing reaction with the amine function of compound (1) to form the N—$R^4$ bond of the compound of formula (3). For example, $R^{4'}$ may include an α,β-unsaturated unit such that the amine of formula (1) will undergo Michael addition with the compound of formula (2) to provide a compound of formula (3). Alternatively, $R^{4'}$ may include a suitable leaving group (e.g., tosylate, mesylate, halogen) such that the amine of formula (1) will undergo nucleophilic addition with the compound of formula (2) to provide a compound of formula (3). The skilled artisan will recognize that other functional groups and additional synthetic steps may be employed to affect the reaction of the compounds of formula (1) and formula (2) to provide a compound of formula (3).

Treatment of the compound of formula (3) with an amine of formula (4) will provide an amide of formula (5). In certain embodiments, the formation of the amide of formula (5) can be accomplished under refluxing conditions, driving the reaction forth by removing water produced upon the formation of the amide bond. Treatment of the compound of formula (5) with a compound of formula (6), such as a carboxylic acid, will provide a quaternary cationic ammonium compound of formula (7). In certain embodiments, the synthetic steps can be performed sequentially in one pot, thereafter isolating the compounds of formula (7) using known isolation and purification techniques.

The compounds, compositions, methods, and processes of the invention will be better understood by reference to the following examples, which are intended as an illustration of and not a limitation upon the scope of the invention.

5. EXAMPLES

The foregoing may be better understood by reference to the following examples, which are presented for purposes of illustration and are not intended to limit the scope of the invention.

Example 1

N-butyl-N-(3-(cocoamino)-3-oxopropyl)butan-1-aminium acetate

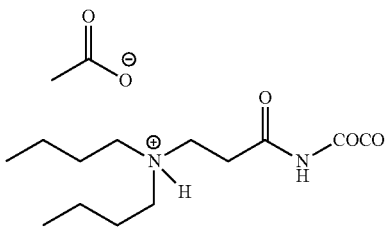

Example 1A 3-(dibutylamino)propanoic Acid

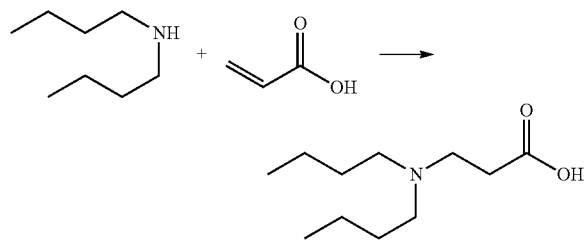

To a 100-mL, 3-neck round bottom flask was added 20.0 g (0.15 mol) dibutylamine and a magnetic stir bar. The flask was fitted with a thermocouple, reflux condenser, and addition funnel containing 11.1 g (0.15 mol) acrylic acid. The acrylic acid was added dropwise to the stirring amine. Once the addition was complete, the reaction mixture was heated to 120° C. for 4 hours. The product was a colorless to light yellow solid at ambient temperature. Complete conversion was confirmed by the disappearance of dibutylamine by TLC (1/5 CHCl$_3$/MeOH with 0.4% v/v NH$_4$OH) and developed in an iodine chamber. FTIR-IR peaks (cm$^{-1}$): 2956, 2930, 2869, 1615, 1344, 1288, 690.

Example 1B 3-(dibutylamino)-N-cocopropanamide

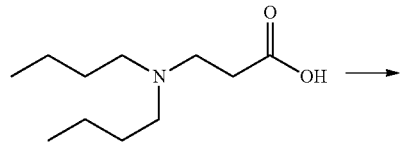

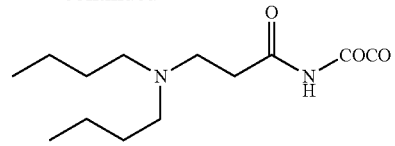

To a 100 mL, 3-neck round bottom flask was added 20.0 g (0.10 mol) 3-(dibutylamino)propanoic acid, 19.0 g cocoamine (approximately 0.10 mol), and a magnetic stir bar. The flask was fitted with a thermocouple, insulated Dean-Stark trap with reflux condenser, and a glass stopper. The reaction mixture was heated at 165° C. for 5 hours or until the calculated volume of water was collected. The product was a yellow-orange liquid. Complete conversion was confirmed by the disappearance of the carboxylic acid starting material by TLC (8/1 CHCl$_3$/MeOH with 0.5% v/v NH$_4$OH) and developed in an iodine chamber. FTIR-IR peaks (cm$^{-1}$): 3287, 3075, 2953, 2921, 2850, 1643, 1549, 1462, 1375, 721.

Example 1C

N-butyl-N-(3-(cocoamino)-3-oxopropyl)butan-1-aminium acetate

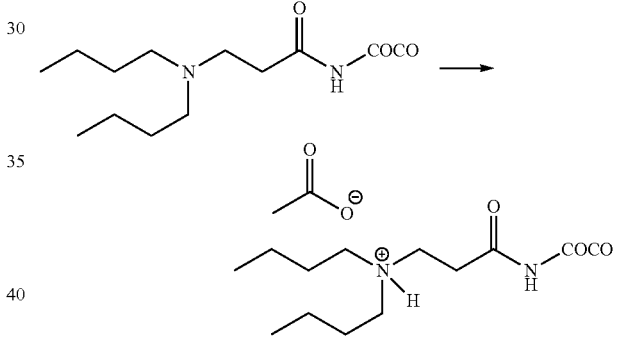

To a 20 mL scintillation vial was added 5.0 g (approximately 13.6 mmol) 3-(dibutylamino)-N-cocopropanamide, 0.8 g (13.5 mmol) acetic acid, and a magnetic stirbar. The reaction mixture was stirred for 2 hours at ambient temperature. The final product was a thick yellow-orange oil. FTIR-IR peaks (cm$^{-1}$): 3286, 2956, 2921, 2850, 1643, 1553, 1463, 1399, 1374, 1249, 720, 656.

Example 1D

N-butyl-N-(3-(cocoamino)-3-oxopropyl)butan-1-aminium acetate

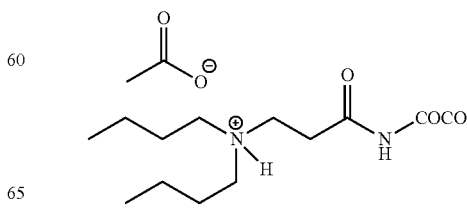

A one-pot synthesis of N-butyl-N-(3-(cocoamino)-3-oxopropyl)butan-1-aminium acetate was achieved as follows: To a 250-mL, 3-neck round bottom flask was added 40.00 g (0.31 mol) dibutylamine and a magnetic stirbar. The flask was fitted with a thermocouple, reflux condenser, and addition funnel containing 22.30 g (0.31 mol) acrylic acid. The acrylate was added to the stirring amine slowly. Once the addition was complete, the addition funnel was replaced with a glass stopper and the reaction mixture was heated at 120° C. for 2 hours. Upon cooling to ambient temperature, an orange solid was formed. Complete conversion was confirmed by the disappearance of the dibutylamine starting material by TLC (1/5 CHCl$_3$/MeOH with 0.5% v/v NH$_4$OH). To the orange solid was added 60.58 g (0.31 mol) cocoamine. An insulated Dean-Stark trap was attached to the apparatus between the flask and reflux condenser for water removal. The reaction mixture was heated at 165° C. for 6 hours at which time TLC analysis (8/1 CHCl$_3$/MeOH with 0.5% v/v NH$_4$OH) confirmed the disappearance of the intermediate carboxylic acid. Upon cooling to ambient temperature a light orange liquid was formed. To the resulting amide at ambient temperature was slowly added 18.59 g (0.31 mmol) acetic acid and the reaction mixture was stirred at ambient temperature for 2 hours. FTIR-IR peaks (cm$^{-1}$): 3286, 2956, 2921, 2850, 1643, 1553, 1463, 1399, 1374, 1249, 720, 656.

Example 2

N,N-dibutyl-N-(3-(cocoamino)-3-oxopropyl)hexan-1-aminium bromide

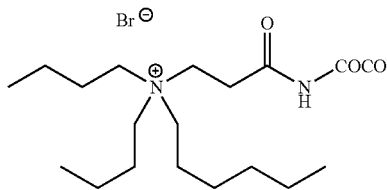

To a 250-mL, 3-neck round bottom flask was added 40.00 g (0.31 mol) dibutylamine and a magnetic stirbar. The flask was fitted with a thermocouple, reflux condenser, and addition funnel containing 22.30 g (0.31 mol) acrylic acid. The acrylate was added to the stirring amine slowly. Once the addition was complete, the addition funnel was replaced with a glass stopper and the reaction mixture was heated at 120° C. for 2 hours. Upon cooling to ambient temperature, an orange solid was formed. Complete conversion was confirmed by the disappearance of the dibutylamine starting material by TLC (1/5 CHCl$_3$/MeOH with 0.5% v/v NH$_4$OH). To the orange solid was added 60.58 g (0.31 mol) cocoamine. An insulated Dean-Stark trap was attached to the apparatus between the flask and reflux condenser for water removal. The reaction mixture was heated at 165° C. for 6 hours at which time TLC analysis (8/1 CHCl$_3$/MeOH with 0.5% v/v NH$_4$OH) confirmed the disappearance of the intermediate carboxylic acid. Upon cooling to ambient temperature a light orange liquid was formed. To the resulting amide at ambient temperature was added 51.09 g (0.31 mol) 1-bromohexane and 42.07 g 2-propanol. The reaction mixture was heated at 97.5° C. for 6 hours.

Example 3

Wheel Box Test Procedure

In order to test each of the examples for corrosion inhibiting ability, wheel box testing from NACE (National Association of Corrosion Engineers) publication ID182 (December 1982) was performed. The wheel box test is a test that is often used in the field of corrosion to compare the performance of one corrosion inhibitor to another. The wheel box apparatus, depicted in FIG. 1, includes multiple test bottles 110, each bottle including a metallic coupon 120 submerged in the test fluid 130.

The tests were conducted using bottles saturated with $CO_2$ on a wheel in an oven. Each bottle contained a 1018 carbon steel coupon used for weight loss analysis upon completion of the test. This test was conducted using synthetic seawater and LVT-200 (kerosene). The tests were conducted at 90:10 water to oil ratio at 176° F. The corrosion inhibiting compositions were dosed at 10, 100, 500, 1,000, 5,000, 7,500, and 15,000 ppm, and each test was performed in triplicate. The test duration was 24 hours. The standard set of conditions used are set forth below:
  a. Temperature=176° F.
  b. Oil=10% LVT-200
  c. Brine=90% ASTM Seawater brine
  d. $CO_2$ Saturated
  e. Test Duration=24 hours
  f. Inhibitor Dosage=10, 100, 500, 1,000, 5,000, 7,500, or 15,000 ppm, based on total fluids The performance of the corrosion inhibitors was evaluated relative to an average corrosion rate of three untreated samples (i.e., blanks). The untreated bottles exhibited much higher corrosion rates than the treated bottles. This allowed the corrosion inhibitors to be evaluated by their relative percent protection.

The results from the wheelbox test are shown in Table 1. Corrosion rates from three untreated samples were compared to triplicate runs with the product of Example 1 (referred to herein as Sample 1); Example 1 supplemented with 2-mercaptoethanol (2-ME) (referred to herein as Sample 2); and a commercially available corrosion inhibitor comprising benzyldimethylalkyl ammonium chlorides (referred to herein as Sample 3). Sample 2 was prepared to determine if the 2-ME enhances the corrosion performance of N-butyl-N-(3-(cocoamino)-3-oxopropyl)butan-1-aminium acetate.

Sample 1: N-butyl-N-(3-(cocoamino)-3-oxopropyl)butan-1-aminium acetate;
Sample 2: N-butyl-N-(3-(cocoamino)-3-oxopropyl)butan-1-aminium acetate+2-ME;
Sample 3: Commercially available corrosion inhibitor comprising benzyldimethylalkyl ammonium chlorides.

TABLE 1

| Wheelbox test results[1] | | | |
|---|---|---|---|
| Dosage (ppm) | Sample 1 (% protection) | Sample 2 (% protection) | Sample 3 (% protection) |
| 10 | 43% | 50% | 95% |
| 100 | 96% | 95% | 97% |
| 500 | 98% | 97% | 91% |
| 1000 | 94% | 92% | 92% |
| 5000 | 90% | 91% | 92% |
| 7500 | 89% | 91% | 92% |
| 15000 | 88% | 91% | 92% |

[1]Blanks tested at 0 ppm dosage of inhibitor showed 0% protection.

Figure 2:
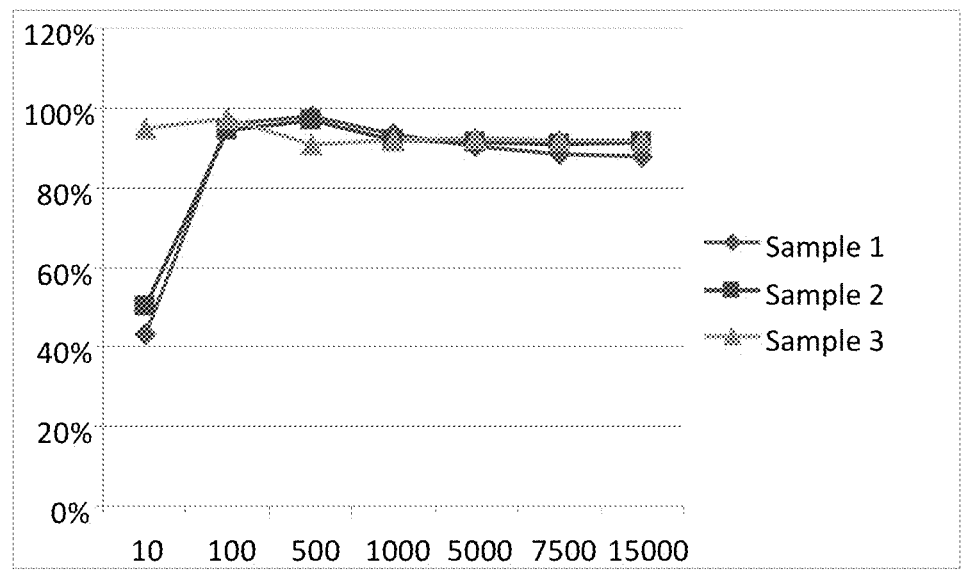
FIG. 2 depicts a dosage response curve showing corrosion protection provided by compounds of the invention.

All three samples were tested at 10, 100, 500, 1,000, 5,000, 7,500, and 15,000 ppm. As shown in Table 1 and FIG. 2, all three samples tested at dosages of 100-15,000 showed 88-98% protection compared to the blank. This data demonstrates that compounds of formula (I), N-butyl-N-(3-(cocoamino)-3-oxopropyl)butan-1-aminium acetate in particular, with or without 2-ME, act as corrosion inhibitors.

Example 4

Bubble Test Procedure

The bubble test simulates low flow areas where little or no mixing of water and oil occurs. The same brine composition and synthetic oil (LVT-200) was used in this test as in the wheelbox test of Example 3. The ratio of water to oil was 80:20. The brine was placed into kettles and purged with $CO_2$. The brine was continually purged with $CO_2$ to saturate the brine prior to starting the test. After the test began the test cell was blanketed with $CO_2$ through the duration of the test to maintain saturation. The kettles were stirred at 150 revolutions per minute (rpm) for the duration of the test to maintain thermal equilibrium at 60° C. The corrosion rate was measured by Linear Polarization Resistance (LPR) techniques. The working electrode used was 1018 carbon steel. The counter and reference electrodes were both 316 stainless steel. The electrodes were all cleaned and polished prior to testing. The kettles were dosed with Samples 1-4 and a blank as described in Table 2. The results of the bubble test are shown in Table 2.

Sample 1: N-butyl-N-(3-(cocoamino)-3-oxopropyl)butan-1-aminium acetate;
Sample 2: N-butyl-N-(3-(cocoamino)-3-oxopropyl)butan-1-aminium acetate+2-ME;
Sample 3: Commercially available corrosion inhibitor comprising benzyldimethylalkyl ammonium chlorides;
Sample 4: N-butyl-N-(3-(cocoamino)-3-oxopropyl)butan-1-aminium acetate+Commercially available corrosion inhibitor comprising benzyldimethylalkyl ammonium chlorides.

TABLE 2

Bubble test results

| Chemical | Dosage (ppm) | Baseline (mpy) | 2 hrs after dosing | | 8 hrs after dosing | | End of testing | |
|---|---|---|---|---|---|---|---|---|
| | | | mpy | % P | mpy | % P | mpy | % P |
| Blank | 0 | 278.0 | 394.2 | −41.8 | 346.2 | −24.5 | 340.3 | −22.4 |
| Sample 1 | 7500 | 195.7 | 35.3 | 82.0 | 24.9 | 87.3 | 0.0 | 100.0 |
| Sample 2 | 7500 | 238.8 | 4.9 | 98.0 | 2.1 | 99.1 | 0.0 | 100.0 |
| Sample 3 | 10 | 205.3 | 7.0 | 96.6 | 3.5 | 98.3 | 3.9 | 98.1 |
| Sample 4 | 7500 + 10 | 178.0 | 6.5 | 96.4 | 3.1 | 98.2 | 0.0 | 100.0 |
| Sample 2 | 15 | 175.1 | 63.2 | 63.9 | 62.9 | 64.1 | 74.6 | 57.4 | ppm = parts per million; mpy = Mils per year; % P = percent protection

Prior to dosage, the baseline corrosion rate was established in each kettle and ranged from approximately 175 to 278 mpy. Each sample was then added to the respective kettle and LPR measurements taken at 2, 8, and 21 hours later (end of testing). The untreated (blank) kettle showed very little change in corrosion rate during the test with a starting and ending corrosion rate of 278 and 340 mpy, respectively. On the other hand, all kettles that received chemical(s) demonstrated at least a 63% reduction compared to the baseline corrosion rate. Most important, Sample 1 showed significant corrosion protection when dosed at 7,500 ppm.

Performance of Sample 1 was similar in the presence or absence of 2-ME as a synergist, although there was a slight performance enhancement with the addition of 2-ME. To conduct a comparison to Sample 1, one kettle was dosed with Sample 3 (commercially available corrosion inhibitor) and another kettle was dosed with Sample 4 (N-butyl-N-(3-(cocoamino)-3-oxopropyl)butan-1-aminium acetate plus commercially available corrosion inhibitor). Sample 1 performed similarly to each of Sample 3 and Sample 4.

Although Sample 2 did not perform as well at 15 ppm, this is not a consideration in certain embodiments, as a dosage of 5,000-7,500 ppm may be preferred for the compounds and compositions to provide effective hydrate control as an anti-agglomerates (AA), in addition to their role as corrosion inhibitors.

Taken together, the wheelbox results of Example 3 and the bubble cell test results of Example 4 demonstrate that compounds and compositions of the invention, and N-butyl-N-(3-(cocoamino)-3-oxopropyl)butan-1-aminium acetate in particular, are able to function as a corrosion inhibitors at the dosage of 5,000-7,500 ppm. The 5,000-7,500 ppm dosage range may be preferred in embodiments where the compounds and compositions of the invention will serve as anti-agglomerates in addition to functioning as corrosion inhibitors.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of inhibiting corrosion at a surface, the method comprising contacting the surface with an amount of a compound of formula (I) effective in inhibiting corrosion at the surface, the compound of formula (I) being:

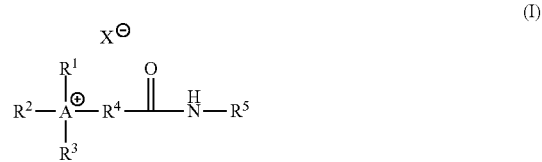

wherein
$R^1$ is $C_1$-$C_6$ alkyl, $C_1$-$C_6$ alkenyl, $C_1$-$C_6$ alkynyl, $C_3$-$C_8$ cycloalkyl, or benzyl;

$R^2$ is $C_4$-$C_6$ alkyl, $C_1$-$C_6$ alkenyl, $C_1$-$C_6$ alkynyl, or $C_3$-$C_8$ cycloalkyl;

$R^3$ is H, $C_1$-$C_6$ alkyl, $C_1$-$C_6$ alkenyl, $C_1$-$C_6$ alkynyl, $C_3$-$C_8$ cycloalkyl, or benzyl;

$R^4$ is —$(CH_2)_t$—, —$[CH_2$—$(CHR^6)_t]$—, or —$[CH_2$—$CHR^6O)_u$—$(CH_2)_t]$—;

$R^5$ is $C_4$-$C_{20}$ alkyl or $C_4$-$C_{20}$ alkenyl;

$R^6$ is H, $C_1$-$C_6$ alkyl, $C_1$-$C_6$ alkenyl, $C_1$-$C_6$ alkynyl, or $C_3$-$C_8$ cycloalkyl;

A is N or P;

X is a counterion;

t is an integer independently selected from 1, 2, 3, 4, 5, and 6; and u is an integer independently selected from 1, 2, 3, 4, 5, and 6.

2. The method of claim 1, wherein $R^5$ is $C_4$-$C_{20}$ alkyl.

3. The method of claim 1, wherein $R^5$ is a saturated or unsaturated $C_8$, $C_{10}$, $C_{12}$, $C_{14}$, $C_{16}$, or $C_{18}$.

4. The method of claim 1, wherein
$R^1$ is n-butyl;
$R^2$ is n-butyl;
$R^3$ is H;
$R^4$ is —$CH_2CH_2$—; and
X is acetate anion.

5. The method of claim 4, wherein $R^5$ is —$C_{12}H_{25}$ or —$C_{14}H_{29}$.

6. The method of claim 1, further comprising co-administering with the compound of formula (I) an effective amount of a corrosion inhibitor synergist.

7. The method of claim 6, wherein the corrosion inhibitor synergist is 2-mercaptoethanol.

8. The method of claim 1, wherein the compound of formula (I) provides at least 88% corrosion protection for a 1018 carbon steel coupon in a wheel box test, wherein the wheel box test is characterized by:
(a) a testing temperature of about 176° F.;
(b) a $CO_2$ saturated liquid medium of 10% LVT-200 oil and 90% ASTM Seawater brine;
(c) a test duration of 24 hours; and
(d) an inhibitor dosage of 100, 500, 1,000, 5,000, 7,500, or 15,000 ppm based on total fluids.

9. The method of claim 8, wherein the compound of formula (I) provides about 88-98% corrosion protection.

10. The method of claim 8, wherein
$R^1$ is n-butyl;
$R^2$ is n-butyl;
$R^3$ is H;
$R^4$ is —$CH_2CH_2$—;
$R^5$ is —$C_{12}H_{25}$; and
X is acetate anion.

11. The method of claim 1, wherein the compound of formula (I) provides at least 80% protection after two hours, at least 85% protection after 8 hours, and about 100% protection after 21 hours for a 1018 carbon steel working electrode in a bubble test, wherein the bubble test is characterized by:
(a) a testing temperature of about 60° C.;
(b) a $CO_2$ saturated liquid medium of 20% LVT-200 oil and 80% ASTM Seawater brine; and
(c) an inhibitor dosage of 7,500 ppm based on total fluids.

12. The method of claim 11, wherein the compound of formula (I) provides about 82.0% protection after two hours, about 87.3% protection after 8 hours, and about 100.0% protection after 21 hours.

13. The method of claim 11, wherein
$R^1$ is n-butyl;
$R^2$ is n-butyl;

$R^3$ is H;
$R^4$ is —$CH_2CH_2$—;
$R^5$ is —$C_{12}H_{25}$; and
X is acetate anion.

14. The method of claim 1, wherein the surface is part of an apparatus used in the production, transportation, storage, and/or separation of crude oil and natural gas.

15. The method of claim 1, comprising contacting the surface with an effective amount of a mixture of compounds of formula (I), said mixture represented by formula (I-i),

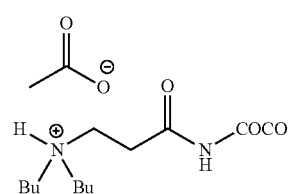

(I-i)

wherein coco is about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$).

16. A method of inhibiting corrosion on a surface of a solid at least partially submerged in a fluid, the method comprising adding to the fluid an amount of a composition comprising a compound of formula (I) effective in inhibiting corrosion on the surface of the solid, the compound being:

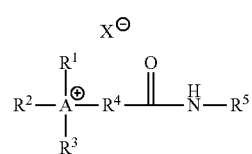

(I)

wherein
$R^1$ is $C_1$-$C_6$ alkyl, $C_1$-$C_6$ alkenyl, $C_1$-$C_6$ alkynyl, $C_3$-$C_8$ cycloalkyl, or benzyl;

$R^2$ is $C_4$-$C_6$ alkyl, $C_1$-$C_6$ alkenyl, $C_1$-$C_6$ alkynyl, or $C_3$-$C_8$ cycloalkyl;

$R^3$ is H, $C_1$-$C_6$ alkyl, $C_1$-$C_6$ alkenyl, $C_1$-$C_6$ alkynyl, $C_3$-$C_8$ cycloalkyl, or benzyl;

$R^4$ is —$(CH_2)_t$—, —$[CH_2$—$(CHR^6)_t]$—, or —$[(CH_2$—$CHR^6O)_u$—$(CH_2)_t]$—;

$R^5$ is $C_4$-$C_{20}$ alkyl or $C_4$-$C_{20}$ alkenyl;

$R^6$ is H, $C_1$-$C_6$ alkyl, $C_1$-$C_6$ alkenyl, $C_1$-$C_6$ alkynyl, or $C_3$-$C_8$ cycloalkyl;

A is N or P;

X is a counterion;

t is an integer independently selected from 1, 2, 3, 4, 5, and 6; and u is an integer independently selected from 1, 2, 3, 4, 5, and 6.

17. The method of claim 16, wherein the composition further comprises one or more additional components, each component independently selected from the group consisting of synergistic compounds, asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, and solvents.

18. The method of claim 16, wherein the composition comprises a mixture of compounds of formula (I), said mixture represented by formula (I-i),

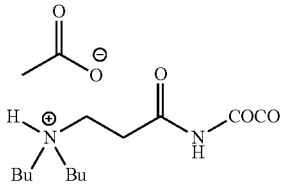

(I-i)

wherein coco is about 6% hexyl ($C_6$), about 7% decyl ($C_{10}$), about 51% dodecyl ($C_{12}$), about 19% tetradecyl ($C_{14}$), about 9% hexadecyl ($C_{16}$), about 2% octadecyl ($C_{18}$), and about 6% combined content of octadecenyl ($C_{18}$) and octadecadienyl ($C_{18}$).

19. The method of claim 16, wherein the composition provides at least 88% corrosion protection for a 1018 carbon steel coupon in a wheel box test, wherein the wheel box test is characterized by:
 (a) a testing temperature of about 176° F.;
 (b) a $CO_2$ saturated liquid medium of 10% LVT-200 oil and 90% ASTM Seawater brine;
 (c) a test duration of 24 hours; and
 (d) an inhibitor dosage of 100, 500, 1,000, 5,000, 7,500, or 15,000 ppm based on total fluids.

20. The method of claim 16, wherein the composition provides about 98% protection after two hours, about 99% protection after 8 hours, and about 100% protection after 21 hours for a 1018 carbon steel working electrode in a bubble test, wherein the bubble test is characterized by:
 (a) a testing temperature of about 60° C.;
 (b) a $CO_2$ saturated liquid medium of 20% LVT-200 oil and 80% ASTM Seawater brine; and
 (c) an inhibitor dosage of 7,500 ppm based on total fluids.

21. The method of claim 1 wherein
 $R^1$ is $C_1$-$C_6$ alkyl;
 $R_2$ is $C_4$-$C_6$ alkyl;
 $R^3$ is H or $C_1$-$C_6$ alkyl;
 $R^4$ is —$CH_2CH_2$—;
 $R^5$ is $C_4$-$C_{20}$ alkyl; and
 A is N.

22. The method of claim 16 wherein
 $R^1$ is $C_1$-$C_6$ alkyl;
 $R_2$ is $C_4$-$C_6$ alkyl;
 $R^3$ is H or $C_1$-$C_6$ alkyl;
 $R^4$ is —$CH_2CH_2$—;
 $R^5$ is $C_4$-$C_{20}$ alkyl; and
 A is N.

23. The method of claim 1, wherein the amount of the compound is from about 100 ppm to about 45,000 ppm.

24. The method of claim 1, wherein the amount of the compound is from about 5,000 ppm to about 20,000 ppm.

* * * * *